United States Patent
Impero et al.

(10) Patent No.: US 11,015,311 B2
(45) Date of Patent: May 25, 2021

(54) SYSTEM FOR DETECTING AN IMPACT OF A VEHICLE AGAINST A ROAD SAFETY DEVICE

(71) Applicant: Pasquale Impero, Casalnuovo di Napoli (IT)

(72) Inventors: Pasquale Impero, Casalnuovo di Napoli (IT); Luigi Grassia, Lusciano (IT); Salvatore Pirozzi, Parete (IT)

(73) Assignee: Pasquale Impero, Casalnuovo di Napoli (IT)

( * ) Notice: Subject to any disclaimer, the term of this patent is extended or adjusted under 35 U.S.C. 154(b) by 552 days.

(21) Appl. No.: 15/765,794

(22) PCT Filed: Oct. 5, 2016

(86) PCT No.: PCT/IB2016/055963
§ 371 (c)(1),
(2) Date: Apr. 4, 2018

(87) PCT Pub. No.: WO2017/060833
PCT Pub. Date: Apr. 13, 2017

(65) Prior Publication Data
US 2018/0282958 A1    Oct. 4, 2018

(30) Foreign Application Priority Data
Oct. 6, 2015  (IT) .......................... 102015000058497

(51) Int. Cl.
*E01F 15/14*      (2006.01)
*E01F 15/02*      (2006.01)
(Continued)

(52) U.S. Cl.
CPC ............ *E01F 15/146* (2013.01); *E01F 15/02* (2013.01); *G01B 7/18* (2013.01); *G01H 11/08* (2013.01)

(58) Field of Classification Search
CPC . E01F 11/00; E01F 15/02; E01F 15/14; E01F 15/146
See application file for complete search history.

(56) References Cited

U.S. PATENT DOCUMENTS 4,734,725 A * 3/1988 Bierman .......... G08B 13/19632
                                          116/63 R
5,568,211 A * 10/1996 Bamford ................ G03B 17/38
                                          396/429
(Continued)

FOREIGN PATENT DOCUMENTS

EP           1167629 A2      1/2002

OTHER PUBLICATIONS

Cover page and abstract of KR 100781133 B1, Nov. 30, 2007.*
Figure and abstract of KR 2014-W38905, Nov. 12, 2014.*

*Primary Examiner* — Gary S Hartmann
(74) *Attorney, Agent, or Firm* — R. Neil Sudol; Henry D. Coleman

(57) ABSTRACT

A road safety device has a frame firmly connected to and arranged on a road surface and an irreversibly deformable part connected to the frame for absorbing at least part of the kinetic energy of a vehicle impacting against the road safety device. An associated monitoring system includes a control unit, an image acquiring device connected to the control unit for acquiring at least one image of a vehicle registration number that is nearing the road safety device, a memory for acquiring the image, and a vibration and/or deformation sensor connectable to the frame for detecting a reversible deformation thereof. The sensor is connected to the control unit. The control unit is predisposed to identify an impact of a vehicle against the road safety device on the basis of data received from the sensor.

9 Claims, 1 Drawing Sheet

(51) Int. Cl.
*G01B 7/16* (2006.01)
*G01H 11/08* (2006.01)

(56) References Cited

U.S. PATENT DOCUMENTS

| | | | |
|---|---|---|---|
| 6,539,175 B1* | 3/2003 | Geary | E01F 15/146 396/59 |
| 7,146,345 B2* | 12/2006 | Weik, III | E05F 1/006 705/418 |
| 9,334,686 B2* | 5/2016 | Oakes | G05B 19/0428 |
| 9,640,072 B2* | 5/2017 | White | E01F 13/06 |
| 10,041,218 B2* | 8/2018 | Sanchez De La Cruz | G08G 1/095 |
| 2014/0267728 A1* | 9/2014 | Dahlin | G08G 1/017 348/148 |
| 2019/0234033 A1* | 8/2019 | Sanchez De La Cruz | G08G 1/205 |

* cited by examiner

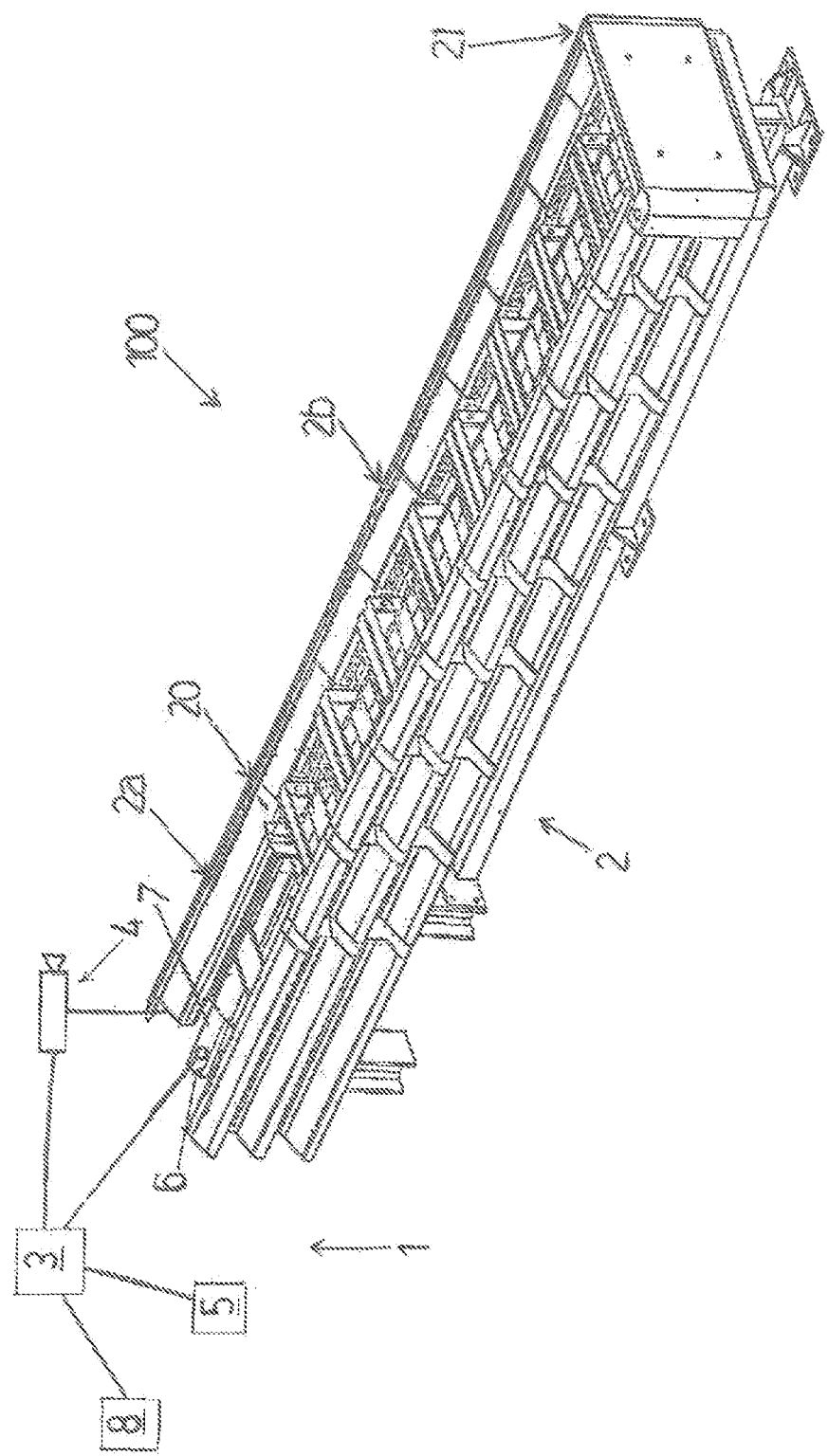

SYSTEM FOR DETECTING AN IMPACT OF A VEHICLE AGAINST A ROAD SAFETY DEVICE

FIELD OF THE INVENTION

The present invention relates to the technical sector concerning monitoring a road safety device.

In particular, the present invention relates to a monitoring system of a road safety device, for detecting an impact of a vehicle against the road safety device, and a relative road safety device group. In particular, the present invention relates to a monitoring method of a road safety device, for detecting an impact of a vehicle against the road safety device.

DESCRIPTION OF THE PRIOR ART

Road safety devices are arranged on a road surface and are designed to absorb a part of the kinetic energy of a vehicle in a case of impact of the vehicle against the road safety device.

Road safety devices can be, for example, of a type for containing or of a type for attenuating an impact. Road safety devices of the containing type, such as for example guard-rails and safety barriers, are designed to contain vehicles within the road area, with the aim of reducing the effects of accidents due to skidding. Road safety devices of the impact-attenuating type, which are for example used at fixed obstacles arranged at the sides of the road or at hairpin bends, are designed to make safe all those critical points of roads which otherwise would occasion an increased risk of injury for the occupants of a vehicle in a case of impact.

A road safety device comprises a frame solidly constrained to and arranged on a road surface and an irreversibly deformable part connected to the frame for absorbing at least a part of the kinetic energy of the vehicle.

A monitoring system of a road safety device is known from document EP 1 167 629, for detecting an impact of a vehicle against the road safety device.

This known monitoring system of a safety device comprises: a control unit fixed to the frame of the road safety device; a television camera, connected to the control unit, for acquiring an image of the number plate of a vehicle approaching the road safety device; a memory for storing the image acquired by the television camera.

The known system further comprises a plurality of accelerometers which are fixed to the irreversibly-deformable part of the road safety device for detecting the acceleration thereof in a case of impact of a vehicle against the road safety device.

The plurality of accelerometers are connected to the control unit in such a way that the control unit can identify an impact of a vehicle against the road safety device on the basis of data received from the accelerometers. In particular, each accelerometer will be connected to the control unit by means of a connecting cable.

In a case of impact of a vehicle against the road safety device, therefore, the deformable part of the road safety device will be crushed and the accelerometers will detect the acceleration thereof. However, owing to the crushing of the deformable part, it is highly probable that the accelerometers will break, as will the connecting cables that connect each accelerometer with the control unit.

Consequently, following an impact, the repair costs will be high as apart from the road safety device having to be repaired, all the broken accelerometers will have to be replaced.

SUMMARY OF THE INVENTION

In the light of the above, the aim of the present invention consists in obviating the above-described drawback.

The above-described aim is attained by a monitoring system of a road safety device for detecting an impact of a vehicle against the road safety device, according to claim 1. The above-described aim is attained by the road safety device group of claim 6, and a monitoring method of the road safety device, according to claim 9.

The monitoring system of a road safety device group of the invention, like the relative method and the road safety device group, proposes to detect the vibrations and/or reversible deformation (by a small entity) of the frame in a case of impact of a vehicle against a road safety device group: for this purpose a vibration and/or deformation sensor is used. When the system is in use, being connected to the frame, the vibration and/or deformation sensor will advantageously not be destined to break at each impact: it is in fact only the irreversibly deformable part of the road safety device which is destined to be crushed while the frame is not (the frame will tend to vibrate or, at most, will be subjected to a reversible deformation of a small entity).

Consequently, following an impact, the repair costs will be limited to the repair costs of the deformable part of the road safety device.

Further, in a case where the vibration and/or deformation sensor is connected to the control unit by means of a connecting cable, said connecting cable will not break in a case of impact.

BRIEF DESCRIPTION OF THE DRAWINGS

Specific embodiments of the invention will be described in the following part of the present description, according to what is reported in the claims and with the aid of the appended table of drawings, in which:

FIG. 1 schematically illustrates a road safety device group, object of the present invention, comprising a monitoring system of a road safety device, also an object of the present invention.

DESCRIPTION OF THE PREFERRED EMBODIMENTS

With reference to the appended table of drawings, reference numeral (1) denotes in its entirety a monitoring system of a road safety device for identifying an impact of a vehicle against the road safety device, and reference numeral (100) denotes a road safety device group.

A road safety device (2) is arranged and designed for absorbing at least a part of a kinetic energy of a vehicle in a case of an impact of the vehicle against the road safety device (2), with the aim of reducing a velocity of the vehicle, reducing a risk of injury for the occupants of the vehicle.

The road safety device (2) comprises a frame (2a) solidly constrained to and arranged on a road surface and an irreversibly deformable part (2b) connected to the frame (2a) for absorbing at least a part of the kinetic energy of the vehicle.

The monitoring system (1) of a road safety device (2), for detecting an impact of a vehicle against the road safety device (2), comprises: a control unit (3); image acquiring means (4) for acquiring at least an image of a vehicle registration number which vehicle is approaching the road safety device (2), which image acquiring means (4) are connected to the control unit (3); a memory (5) for acquiring the at least an image acquired by the image acquiring means (4).

The monitoring system (1) of a road safety device (2) further comprises a vibration and/or deformation sensor (6) which is connectable to the frame (2a) of a road safety device (2) for detecting a vibration and/or a reversible deformation of the frame (2a) of the road safety device (2). The vibration and/or deforming sensor (6) is connected to the control unit (3).

Further, the control unit (3) is predisposed to identify an impact of a vehicle against the road safety device (2) on the basis of data received from the vibration and/or deforming sensor (6).

It is specified that, with the aim of detecting a vibration of the frame (2a) of the road safety device (2), a single vibration and/or deforming sensor (6) can be used.

The vibration and/or deformation sensor (6) is preferably a piezoelectric or piezoresistive sensor.

These types of sensors are advantageously available on the market and have modest costs.

With reference to the FIGURE, the monitoring system (1) of a road safety device (2) preferably comprises a plate (7), which is fixable to the frame (2a) of the road safety device (2), to which plate (7) the vibration and/or deforming sensor (6) is connected.

During the installation step of the monitoring system (1) of a road safety device (2), it will advantageously be sufficient to fix the plate (7) to the frame (2b) of the road safety device (2): this operation is simple and rapid.

The plate (7) can be L-shaped.

The control unit (3) is preferably connected to the image acquiring means (4).

The monitoring system (1) of a road safety device (2) preferably comprises data transmission means (8) for transmitting a signal to an operational centre, which data transmission means (8) are connected to the control unit (3).

The data transmission means (8) advantageously enable a rapid intervention on the part of the road safety authorities.

The data transmission means (8) can be of the GSM or GPRS or UMPTS or Wi-Fi type, according to the signal that they must transmit to the operational centre.

Further, the control unit (3) can activate data transmission means (8) each predetermined time period, so that they transmit a correct functioning signal of the vibration and/or deforming sensor (6) to the operational centre. In fact, in a case where for a long period of time the operational centre does not receive signals from the control unit (3), as no impacts take place, it might be thought that there was a malfunctioning of the vibration and/or deforming sensor (6). The sending of a periodic signal of correct functioning of the vibration and/or deforming sensor (6) can advantageously signal a case of malfunctioning.

Further, the control unit (3) can transmit to the operational centre a correct functioning signal of the image acquiring means (4) at each predetermined time period.

The road safety device (2) monitoring system (1) preferably comprises a power supply battery (not illustrated).

Alternatively the monitoring system (1) of a road safety device (2) can be powered by the electricity grid.

The image acquiring means (4) can be arranged for acquiring at least a sequence of images of a registration number of a vehicle nearing the road safety device (2), of the vehicle and of the road safety device (2). This is to say that the image acquiring means (4) acquire a video that advantageously enables comprising the dynamics of the impact (for example, it enables not only capturing the registration number of the vehicle but also the angle of impact of the vehicle).

The image acquiring means (4) can comprise a television camera.

The memory (5) can be, for example, an internal memory (5) of the television camera or a memory (5) that is external of the television camera.

The memory (5) is preferably external of the television camera and is connected to the control unit (3). This memory (5) can advantageously also be used for memorising the data detected by the vibration and/or deforming sensor (6).

The road safety device group (100) comprises: a road safety device (2) arranged and designed for absorbing at least a part of a kinetic energy of a vehicle in a case of an impact of the vehicle against the road safety device (2), with the aim of reducing a velocity of the vehicle and thus reducing a risk of injury for occupants of the vehicle, which road safety device (2) comprises a frame (2a) solidly constrained to and arranged on a road surface and an irreversibly deformable part (2b) connected to the frame (2a) for absorbing the at least part of the kinetic energy of the vehicle; a monitoring system (1) of a road safety device (2) according to any one of the above-described embodiments, wherein the vibration and/or deforming sensor (6) is connected to the frame (2a) of the road safety device (2).

The road safety device group (100) is preferably such that: the road safety device (2) is an impact attenuator, the irreversibly deformable part (2b) has a longitudinal development and comprises a first end (20) which is fixed to a portion of the frame (2a) and a second end (21) which conforms a head for abutting a vehicle in case of impact; the vibration and/or deformation sensor (6) is connected to the portion of the frame (2a) of the road safety device (2) to which the first end (20) of the irreversibly deformable part (2b) is fixed (see FIG. 1).

In a case where the road safety device (2) monitoring system (1) comprises a plate (7) to which the vibration and/or deformation sensor (6) is connected, the road safety group device group (100) is such that the plate (7) is fixed to the portion of the frame (2a) of the road safety device (2) to which the first end (20) of the irreversibly deformable part (2b) of the road safety device (2) is fixed.

The probabilities of damage of the vibration and/or deforming sensor (6) in a case of a vehicle impact against the road safety device (2) are advantageously further reduced.

The following comprises a description of a monitoring method of a road safety device (2), object of the present invention, for identifying an impact of a vehicle against the road safety device (2). The monitoring method of a road safety device (2) comprises steps of: acquiring at least an image of a vehicle registration number which vehicle is nearing the road safety device (2); memorising the at least an image acquired by the image acquiring means (4); detecting a vibration and/or a reversible deformation of the frame (2a) of the road safety device (2) and identifying, on the basis of the vibration and/or reversible deformation detected, an impact of a vehicle against the road safety device (2).

The step of identifying an impact of a vehicle against the road safety device (2) preferably comprises a step of comparing the value of the vibration and/or reversible deformation detected with a threshold value and a step of identifying the impact of the vehicle if the vibration and/or reversible deformation value detected is greater than the threshold value.

In this way, in a case that an impact occurs at a very low velocity (for example lower than 10 Km/h), the control unit detects no impact. In this way false alarms are advantageously avoided.

The invention claimed is:

1. A road safety device group, comprising:
a road safety device arranged and designed for absorbing at least a part of a kinetic energy of a vehicle in a case of an impact of the vehicle against the road safety device, thereby reducing a velocity of the vehicle and reducing a risk of injury for occupants of the vehicle, the road safety device including (i) a frame firmly connected to and arranged on a road surface and (ii) an irreversibly deformable part connected to the frame for absorbing kinetic energy of the vehicle; and
a road safety device monitoring system for identifying an impact of a vehicle against the road safety device,
the road safety device monitoring system comprising:
a control unit;
image acquiring means for acquiring at least one image of a vehicle registration number of a vehicle in proximity to and approaching the road safety device, the image acquiring means being connected to the control unit;
a memory for storing the at least one image acquired by the image acquiring means; and
a vibration and/or deformation sensor mounted to the frame of the road safety device for detecting a vibration and/or a reversible deformation of the frame of the road safety device, the vibration and/or deformation sensor being connected to the control unit,
the control unit being predisposed to identify an impact of a vehicle against the road safety device on the basis of data received from the vibration and/or deformation sensor via the frame of the road safety device.

2. The road safety device group according to claim 1, wherein the vibration and/or deformation sensor is a piezoelectric or piezoresistive sensor.

3. The road safety device group according to claim 1, wherein the road safety device monitoring system further comprises a plate fixable to the frame of the road safety device, the vibration and/or deformation sensor being connected to the plate.

4. The road safety device group according to claim 1, wherein the road safety device monitoring system further comprises data transmission means for transmitting a signal to an operational center, the data transmission means being connected to the control unit.

5. The road safety device group according to claim 1, wherein the road safety device monitoring system further comprises a supply battery.

6. The road safety device group of claim 1, wherein the road safety device is an impact attenuator, the irreversibly deformable part of the road safety device has a longitudinal development and comprises a first end fixed to a portion of the frame and a second end forming a head for abutting a vehicle in a case of impact, the vibration and/or deformation sensor being connected to the portion of the frame of the road safety device to which the first end of the irreversibly deformable part of the road safety device is fixed.

7. The road safety device group of claim 6, wherein the road safety device monitoring system further comprises a plate to which the vibration and/or deformation sensor is connected, the plate being fixed to the portion of the frame of the road safety device to which the first end of the irreversibly deformable part of the road safety device is fixed.

8. A road safety device monitoring method for identifying an impact of a vehicle against a road safety device, the road safety device being arranged and designed for absorbing at least a part of a kinetic energy of a vehicle in a case of an impact of the vehicle against the road safety device, thereby reducing a velocity of the vehicle and reducing a risk of injury for occupants of the vehicle, the road safety device comprising a frame firmly connected to and arranged on a road surface and an irreversibly deformable part connected to the frame for absorbing kinetic energy of the vehicle,
the road safety device monitoring method comprising steps of:
connecting a vibration and/or deformation sensor to the frame of the road safety device;
operating image acquiring means to acquire at least one image of a vehicle registration number of a vehicle in proximity to and approaching the road safety device;
memorizing the at least one image acquired by the image acquiring means;
operating the vibration and/or deformation sensor to detect a vibration and/or a reversible deformation of the frame of the road safety device and identifying, on the basis of the vibration and/or reversible deformation detected, an impact of a vehicle against the road safety device.

9. The road safety device monitoring method of claim 8, wherein the step of identifying an impact of a vehicle against the road safety device comprises a step of comparing, with a threshold value, the value of the vibration and/or reversible deformation detected and a step of identifying the impact of the vehicle if the vibration and/or reversible deformation value detected is greater than the threshold value.

* * * * *